US008979110B2

(12) United States Patent
Talavasek et al.

(10) Patent No.: US 8,979,110 B2
(45) Date of Patent: Mar. 17, 2015

(54) BICYCLE WITH BATTERY MOUNT

(75) Inventors: Jan Talavasek, Knonau (CH); Amber R. Lucas, Lucerne (CH); Ian Hamilton, San Jose, CA (US); Robert F. Meyer, Mountain View, CA (US); Markus Spenninger, Lucerne (CH); Holger Krauss, Menzingen (CH)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 13/422,849

(22) Filed: Mar. 16, 2012
(Under 37 CFR 1.47)

(65) Prior Publication Data
US 2013/0241170 A1 Sep. 19, 2013

(51) Int. Cl.
*B62K 1/00* (2006.01)
*B62K 19/40* (2006.01)
*B62M 6/90* (2010.01)

(52) U.S. Cl.
CPC . *B62K 19/40* (2013.01); *B62M 6/90* (2013.01)
USPC .................................................. 280/279

(58) Field of Classification Search
CPC ................................. B62J 11/00; B60R 16/04
USPC ......... 180/206.1, 207.3, 220, 68.5; 280/288.4
See application file for complete search history.

(56) References Cited

U.S. PATENT DOCUMENTS

| | | | |
|---|---|---|---|
| 5,683,831 A * | 11/1997 | Baril et al. | 429/96 |
| 6,564,893 B2 * | 5/2003 | Lipman | 180/68.5 |
| 6,669,220 B2 * | 12/2003 | Meggiolan | 280/288.4 |
| 6,923,355 B2 * | 8/2005 | Campagnolo | 224/414 |
| 7,100,932 B2 * | 9/2006 | Meggiolan | 280/288.4 |
| 7,393,125 B1 | 7/2008 | Lai | |
| 7,934,576 B2 * | 5/2011 | Munksoe | 180/220 |
| 2005/0056474 A1 * | 3/2005 | Damon | 180/68.5 |
| 2005/0280244 A1 * | 12/2005 | Watarai | 280/288.4 |
| 2006/0186158 A1 * | 8/2006 | Ishikawa | 224/419 |
| 2008/0226476 A1 * | 9/2008 | Lau | 417/411 |
| 2010/0175939 A1 * | 7/2010 | Cheng | 180/68.5 |
| 2010/0237585 A1 * | 9/2010 | Binggeli et al. | 280/288.4 |
| 2011/0042156 A1 * | 2/2011 | Vincenz | 180/205 |
| 2012/0313344 A1 * | 12/2012 | Dal Pozzo | 280/288.4 |

FOREIGN PATENT DOCUMENTS

| | | |
|---|---|---|
| CN | 2440737 | 8/2001 |
| DE | 19712326 | 10/1998 |
| DE | 20018366 | 3/2001 |
| DE | 202011000601 | 10/2011 |
| WO | 2008106976 | 9/2008 |
| WO | 2010101400 | 9/2010 |
| WO | 2014060829 | 4/2014 |

* cited by examiner

*Primary Examiner* — Joseph Rocca
*Assistant Examiner* — Conan Duda
(74) *Attorney, Agent, or Firm* — Michael Best & Friedrich LLP

(57) ABSTRACT

A bicycle including a frame, a bottom bracket coupled to the frame and adapted to support a crankset, and a battery pack supported by the frame. The battery pack has a powered end cap with a tapered protrusion and a battery connector on an end of the tapered protrusion. The bicycle also includes a receiver supported by the frame and including a tapered socket in which the tapered protrusion is positioned. The tapered socket includes a power connector detachably coupled to the battery connector.

13 Claims, 12 Drawing Sheets

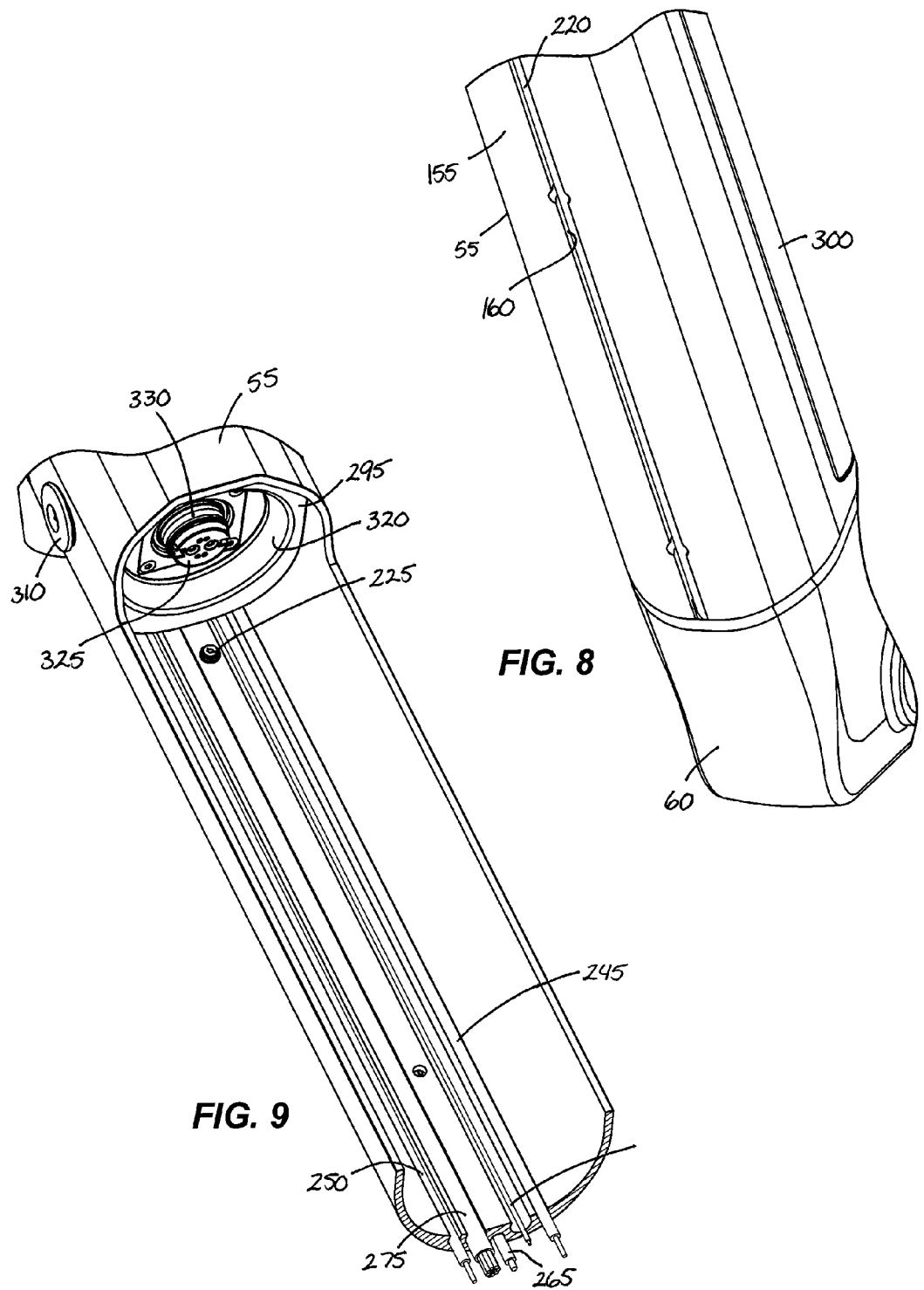

BICYCLE WITH BATTERY MOUNT

BACKGROUND

The present invention relates generally to bicycles, and more specifically to bicycles having an electric motor and battery.

Bicycles commonly have a main frame and a front fork pivotally secured to the main frame. The main frame typically includes a top tube, a down tube, a seat tube, and a rear wheel mount for receiving a rear wheel axle. The front fork typically includes a front wheel mount for receiving a front wheel axle. Steering control of the bicycle is provided by a handlebar that is usually secured to the front fork via a handlebar stem. Some bicycles also include a power source, such as a battery, to provide power to components on the bicycle, and in some cases, to provide motive power to the bicycle.

SUMMARY

The present invention provides a bicycle including a frame, a bottom bracket coupled to the frame and adapted to support a crankset, and a battery pack supported by the frame. The battery pack has a powered end cap with a tapered protrusion and a battery connector on an end of the tapered protrusion. The bicycle also includes a receiver supported by the frame and including a tapered socket in which the tapered protrusion is positioned. The tapered socket includes a power connector detachably coupled to the battery connector.

In another aspect, the present invention provides a bicycle including a frame, a bottom bracket coupled to the frame and adapted to support a crankset, and a battery pack supported by the frame. The battery pack includes a securing end cap, and the bicycle further includes a contact plate that is supported by and movable relative to the frame. The contact plate includes a contact surface that is biased into contact with the securing end cap.

In another aspect, the invention provides a bicycle including a frame, a bottom bracket coupled to the frame and adapted to support a crankset, and battery pack supported by the frame, and a bottle cage mounted on the battery pack.

Other aspects of the invention will become apparent by consideration of the detailed description and accompanying drawings.

BRIEF DESCRIPTION OF THE DRAWINGS

FIG. 7b is an enlarged view of a portion of the frame illustrated in FIG. 7a.

FIG. 8 is a perspective view of an underside of the exterior of the down tube illustrating an exterior cable groove.

FIG. 9 is a perspective view of an interior of the down tube illustrating interior cable grooves.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
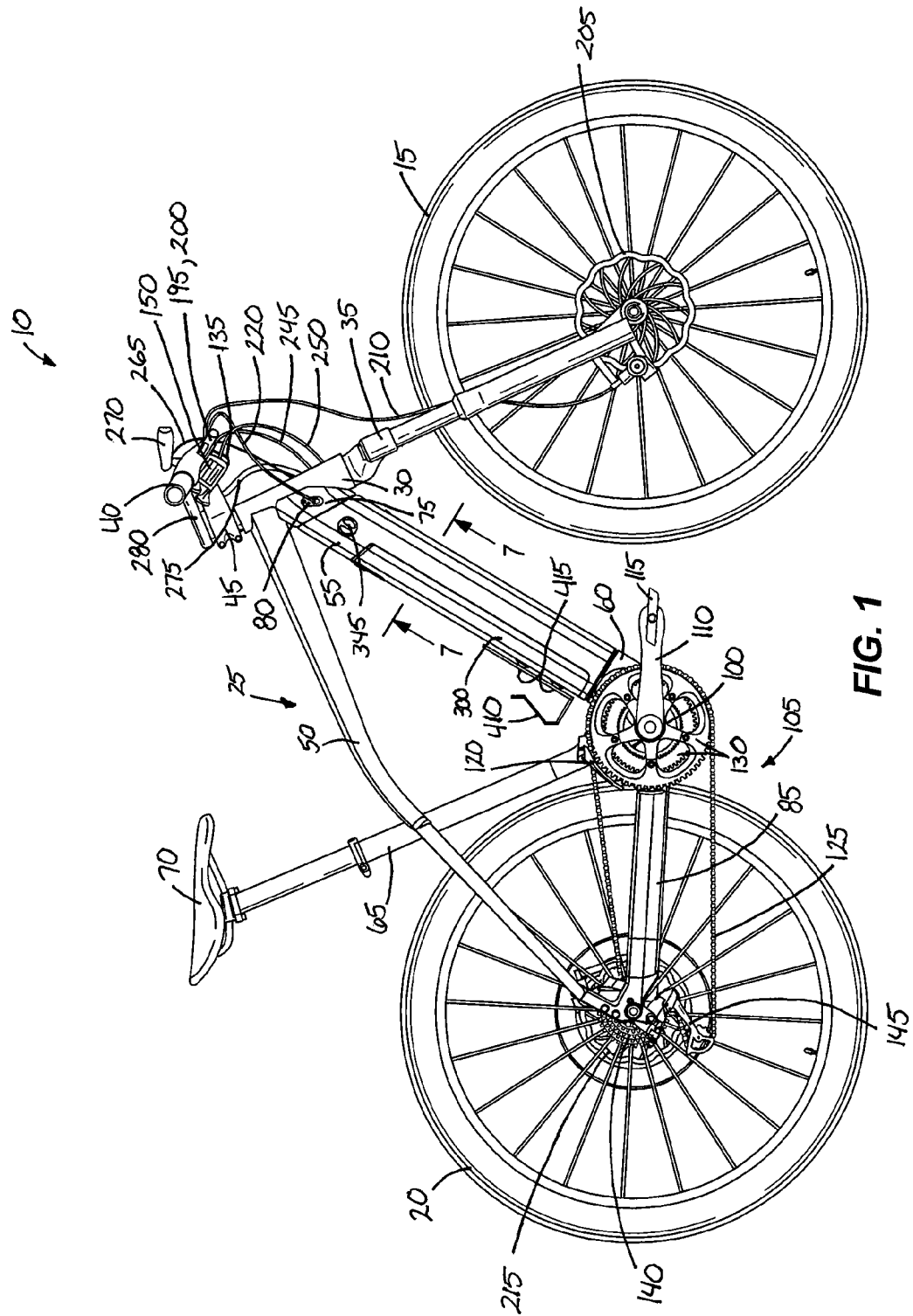
FIG. 1 is a side view of a bicycle including a frame embodying the present invention.

FIG. 1 shows a bicycle 10 that includes a front wheel 15, a rear wheel 20 defining a central plane 22 of the bicycle 10, and a frame 25. The frame 25 has a head tube 30 and a front fork 35 that is rotationally supported by the head tube 30 and that secures the front wheel 15 to the frame 25. A handlebar assembly 40 is coupled to the head tube 30 and is secured to the front fork 35 by a stem assembly 45 such that movement of the handlebar assembly 40 results in movement of the stem assembly 45 and the fork 35.

Figure 2:
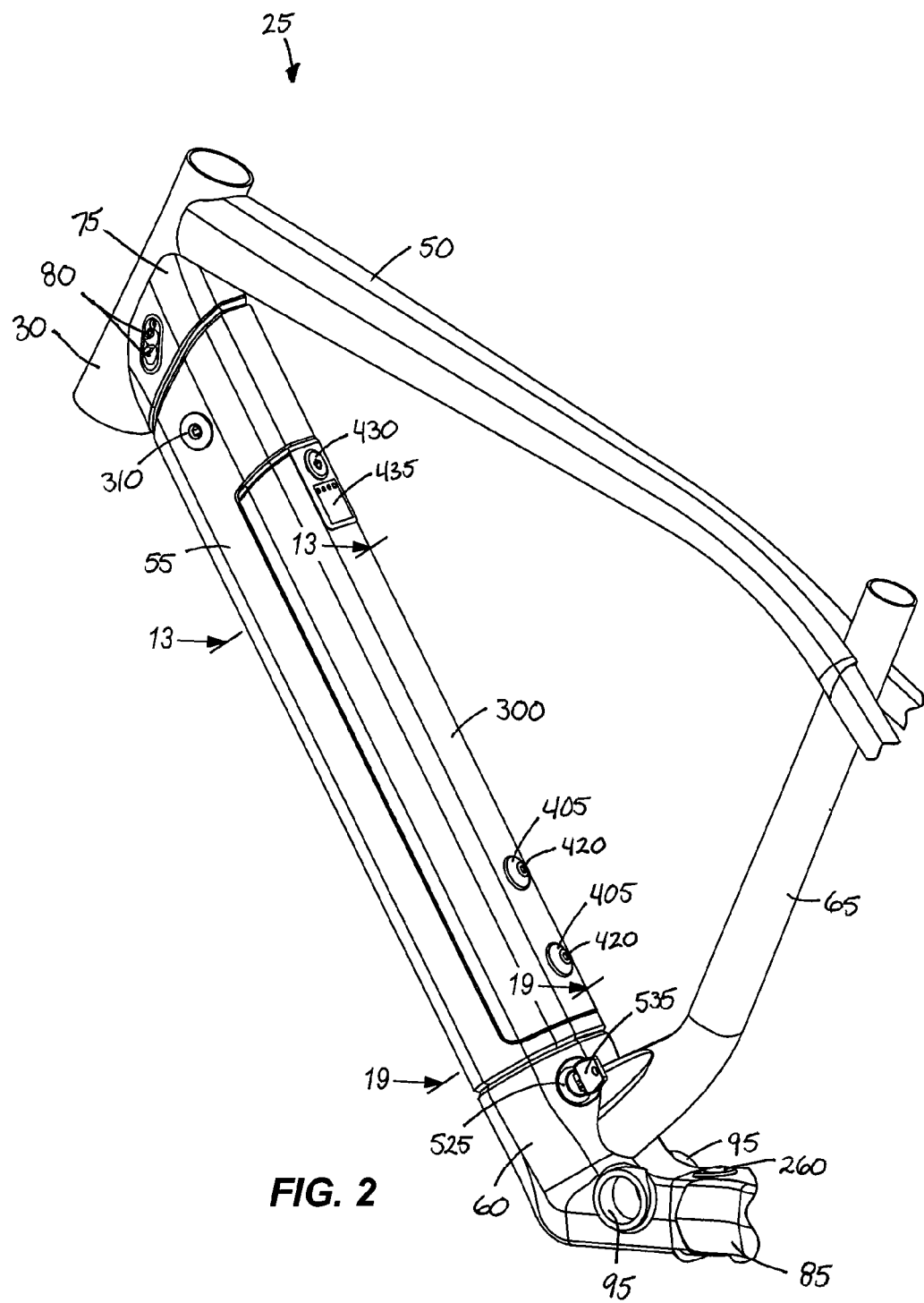
FIG. 2 is a perspective view of a portion of the frame including a down tube, a bottom bracket shell, and a battery pack.

With reference to FIGS. 1 and 2, the frame 25 also has a top tube 50 connected to and extending rearward from the head tube 30, and a down tube 55 connected to the head tube 30 below the top tube 50 and extending generally downward toward and connected to a bottom bracket housing or shell 60 of the frame 25. A seat tube 65 extends upward from the bottom bracket shell 60 and is connected to the top tube 50, and a seat 70 is supported by the seat tube 65.

Figure 3:
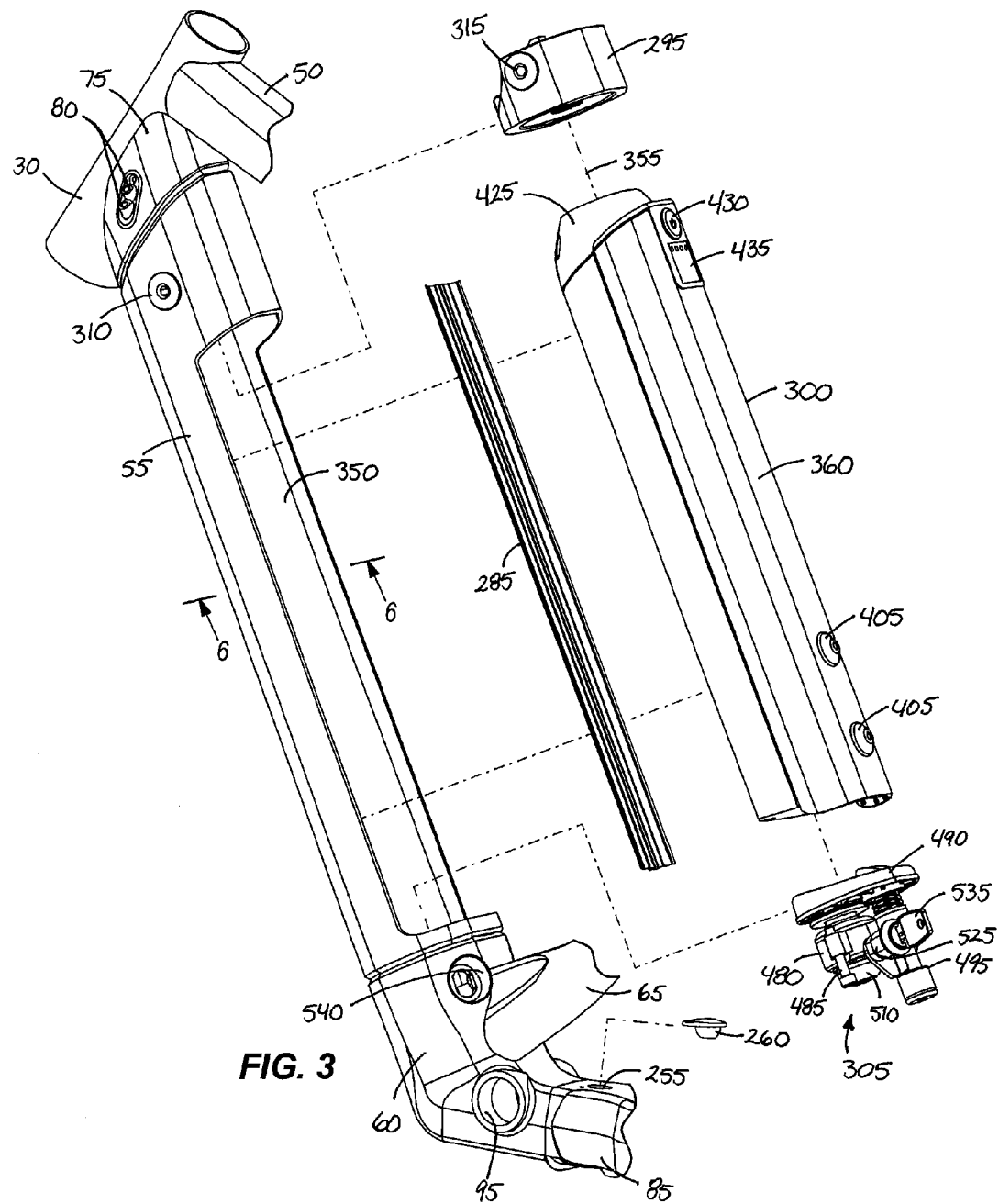
FIG. 3 is an exploded perspective view of the down tube, the battery pack, the bottom bracket shell, a receiver, and a lock mechanism.

As shown in FIGS. 1-3, the down tube 55 is attached to the head tube 30 by a connection tube 75 positioned between the head tube 30 and a down tube 55. As illustrated, one end of the connection tube 75 is shaped to conform to the contour of the head tube 30, and the other end of the connection tube 75 abuts the down tube 55. The connection tube 75 is welded to the head tube 30 and the down tube 55 to rigidly attach the down tube 55 to the head tube 30. The illustrated connection tube 75 also has cable ports 80 coupled to both sides of the connection tube 75. The connection tube 75 can be formed using a hydroforming process or other suitable manufacturing processes.

With reference to FIGS. 1-5 and 18, the bottom bracket shell 60 abuts and is welded to the down tube 55. The bottom bracket shell 60 also attaches the seat tube 65 and chain stays 85 to the remainder of the frame 25. The bottom bracket shell 60 has a kickstand mount 90 and bottom bracket mounts 95 that support a bottom bracket 100 (FIG. 1) to attach a drive train 105 to the bicycle 10. The bottom bracket shell 60 is formed from aluminum by casting, although the shell 60 can be formed from other material (and a suitable manufacturing process).

The drive train 105 includes a crankset 110 that is rotatably mounted to the bottom bracket 100. As shown in FIG. 1, the crankset 110 supports pedals 115 that are engageable by a rider to provide motive force for the bicycle 10. The drive train 105 also includes a front derailleur 120 that shifts a chain 125 between different chain rings 130 (one shown). The front derailleur 120 is actuated by a front shift controller 135 on the handlebar assembly 40. A plurality of rear cogs 140 are mounted to the rear wheel 20 and are connected to the crankset 110 by the chain 125. A rear derailleur 145 shifts the chain 125 between different rear cogs 140 and is actuated by a rear shift controller 150 on the handlebar assembly 40.

Figure 4:
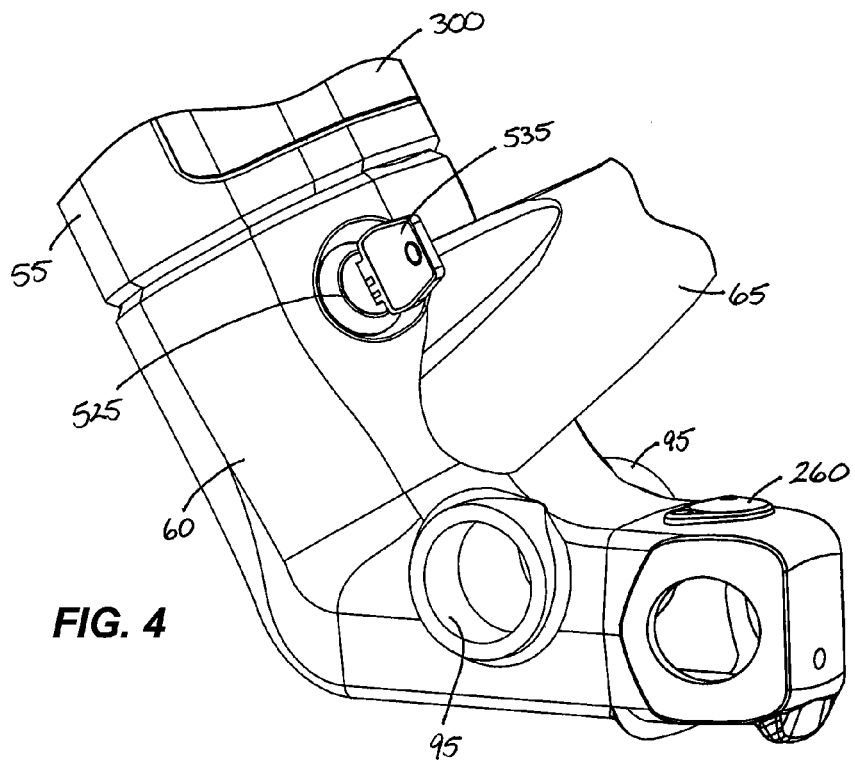
FIG. 4 is a rear perspective view of the bottom bracket shell with chain stays removed.
Figure 5:
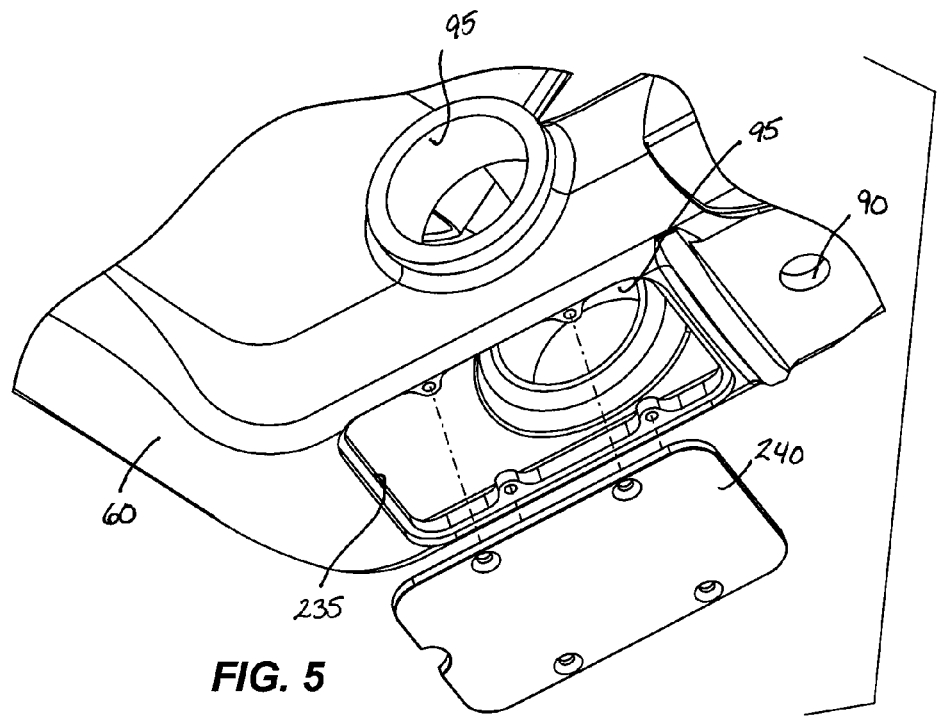
FIG. 5 is an exploded lower perspective view of the bottom bracket shell including an access opening and a door.
Figure 6:
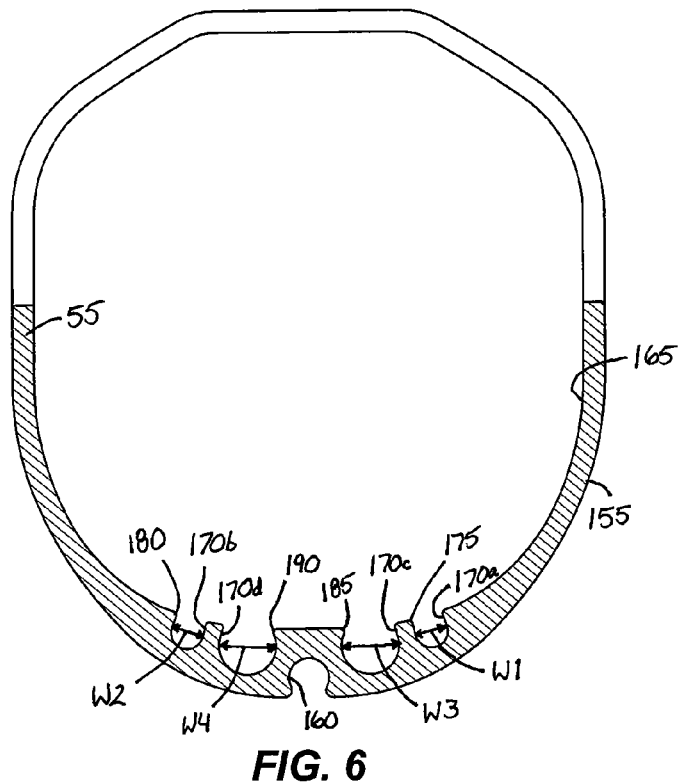
FIG. 6 is a section view of the down tube taken along line 6-6 in FIG. 3.

FIGS. 6-9 show that the down tube 55 has an exterior surface 155 that defines an exterior cable groove 160, and a concave interior surface 165 that defines a plurality of interior cable grooves 170. As illustrated in FIG. 6, the exterior cable groove 160 is recessed into a wall of the down tube 55 and extends longitudinally along the underside of the down tube 55. With reference to FIGS. 4 and 5, the exterior cable groove 160 is arcuate in cross-section and is centered along the underside of the down tube 55.

Referring back to FIGS. 6-9, the interior cable grooves 170 are spaced laterally relative to each other and are recessed into the wall of the down tube 55. As illustrated, the down tube 55 has four interior cable grooves 170a-d that are arcuate in cross-section and that extend longitudinally along the down tube 55. A first interior groove 170a is spaced laterally relative to the vertical central plane 22 and has a first groove width W1 and a first mouth 175 that is slightly narrower than the first groove width W1. A second interior groove 170b is located symmetrically opposite the first interior groove 170a about the central plane 22. The second interior groove 170b has a second groove width W2 and a second mouth 180 that is slightly narrower than the second groove width W2. As illustrated, the first and second groove width W1, W2 are approximately equal, although the widths can differ.

A third interior groove 170c is spaced laterally inward relative to the first interior groove 170a on one side of the central plane 22. The third interior groove 170c has a third groove width W3 and a third mouth 185 that is slightly narrower than the third groove width W3. A fourth interior groove 170d is spaced laterally inward relative to the second interior groove 170b symmetrically opposite the third interior groove 170c (i.e., on the other side of the central plane 22). The fourth interior groove 170d has a fourth groove width W4 and a fourth mouth 190 that is slightly narrower than the fourth groove width W4. As illustrated, the third and fourth groove widths W3, W4 are approximately equal and larger than the first and second groove widths W1, W2, although the widths among the grooves 90 can differ.

With reference to FIG. 1, the bicycle 10 also includes front and rear brake controllers 195, 200 that are attached to the handlebar assembly 40 (as illustrated, the front brake controller 195 is positioned directly behind the rear brake controller 200 in FIG. 1). Optionally, each brake controller 195, 200 can include a switch (not shown) that is closed when the brake controller 195, 200 is actuated. The front brake controller 195 is connected to a front brake 205 by a front brake cable 210, and is routed directly to the front brake 205 along (e.g., through or next to) the head tube 30 and the fork 35.

Figure 13:
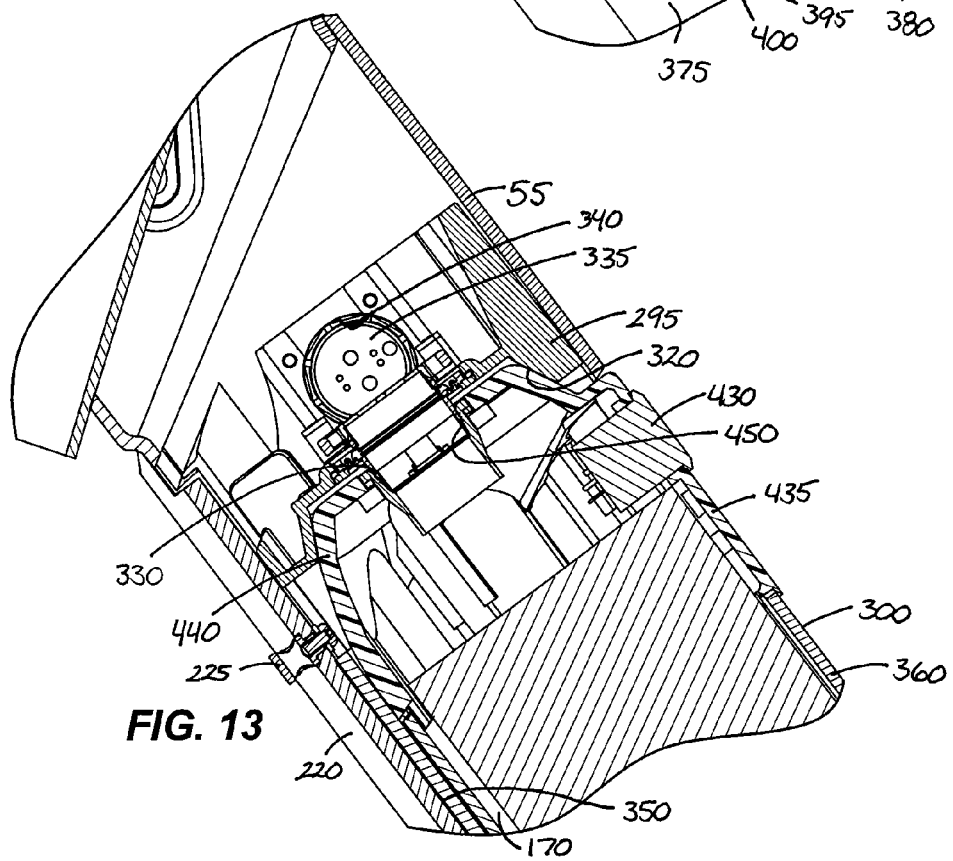
FIG. 13 is a section view of a portion of the frame portion taken along line 13-13 in FIG. 2.
Figure 19:
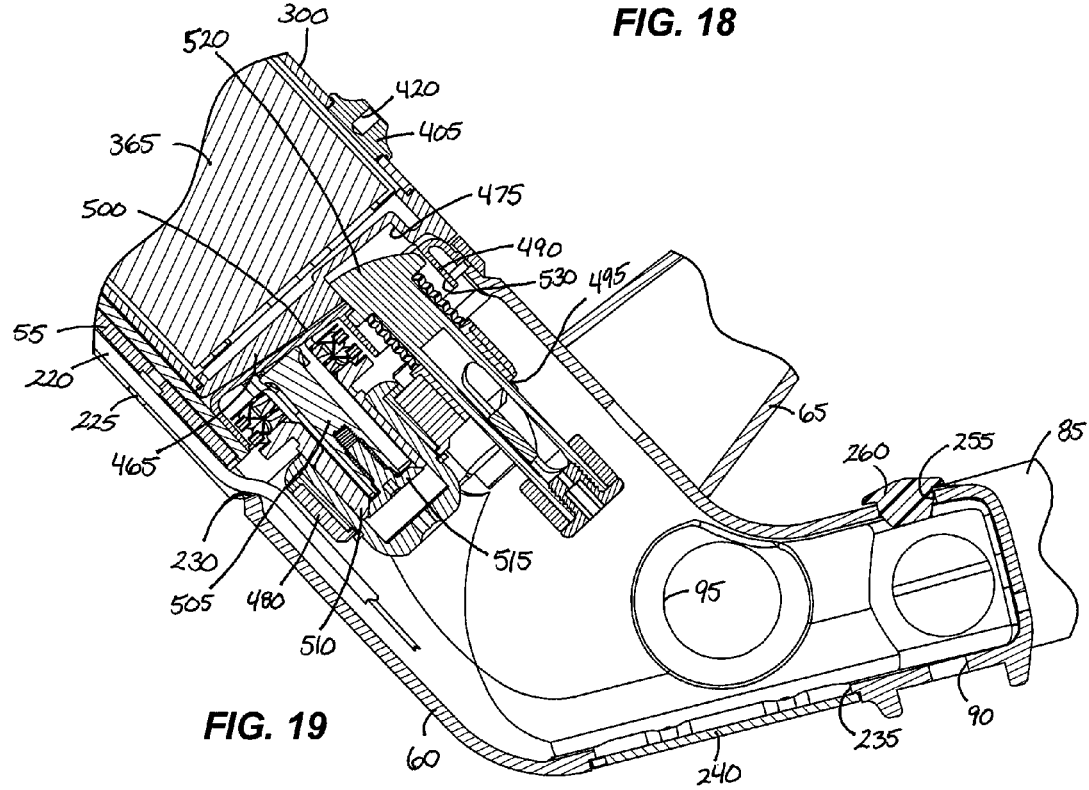
FIG. 19 is a section view of a lower part of the frame taken along line 19-19 of FIG. 2.

The rear brake controller 200 is connected to a rear brake 215 by a rear brake cable 220. The rear brake cable 220 extends from the handlebar assembly 40 and along the bottom of the down tube 55 within the exterior cable groove 160. The rear brake cable 220 is held in engagement with the down tube 55 due to the opening of the groove 85 being slightly narrower than the width of the cable 95. Also, as shown in FIGS. 13 and 19, bolt-on clips 225 are attached to the down tube 55 to hold the rear brake cable 220 in the exterior cable groove 160.

As illustrated, the rear brake cable 220 is a hydraulic brake cable that assists with controlling the rear brake 215 and is routed within the exterior cable groove 160 to, among other things, avoid rupture during assembly of the bicycle 10. In some cases, the exterior groove 160 can support cables for other bicycle components. Further, the size (e.g., width, depth, diameter) of the exterior cable groove 160 can vary depending on the size of the cable routed in the groove 160.

With reference to FIGS. 3-5 and 19, the down tube 55 and the bottom bracket shell 60 cooperatively define an entrance port 230 at the joint between the down tube 55 and the bottom bracket shell 60 so that the rear brake cable 220 can be routed from the exterior of the down tube 55 into the interior of the bottom bracket shell 60. In other words, the entrance port 230 provides a pathway for the rear brake cable 220 from the exterior of the down tube 55 to the interior of the bottom bracket shell 60. As shown in FIG. 5, the bottom bracket shell 60 has an access opening 235 located along the underside of bottom bracket shell 60. The access opening 235 provides access to the interior of the bottom bracket shell 60 so that the rear brake cable 220 can be easily routed through the shell 60 and one of the chain stays 85. A door 240 is detachably secured (e.g., via fasteners, snap-fit arrangement, etc.) to the bottom bracket shell 60 to cover the access opening 235.

With continued reference to FIGS. 1 and 6-9, the front shift controller 135 is connected (e.g., electrically or mechanically) to the front derailleur 120 by a first shift cable 245, and the rear shift controller 150 is connected (e.g., electrically or mechanically) to the rear derailleur 145 by a second shift cable 250. As illustrated, the first shift cable 245 is routed from the front shift controller 135 on the handlebar assembly 40 through one of the cable ports 80 in the connection tube 75 and is directed along the interior of the down tube 55 within the first interior groove 170a toward the bottom bracket housing 60. The bottom bracket shell 60 has an exit port 255 that provides a pathway from the interior of the shell 60 toward the location of the front derailleur 120 on the seat tube 65. A cable guide 260 is positioned in the exit port 255 to guide the first shift cable 245 from the bottom bracket shell 60 upward along the seat tube 65 toward the front derailleur 120.

The second shift cable 250 is routed from the rear shift controller 150 on the handlebar assembly 40 through another cable port 80 in the connection tube 75. The second shift cable 250 is directed along the interior of the down tube 55 within the second interior groove 170b toward the bottom bracket housing 60. The second shift cable 250 extends through the bottom bracket shell 60 and within one of the chain stays 85 to the rear derailleur 145. The first and second shift cables 245, 250 can be directed through the interior of the bottom bracket shell 60 using the access opening 235.

Figure 7B:
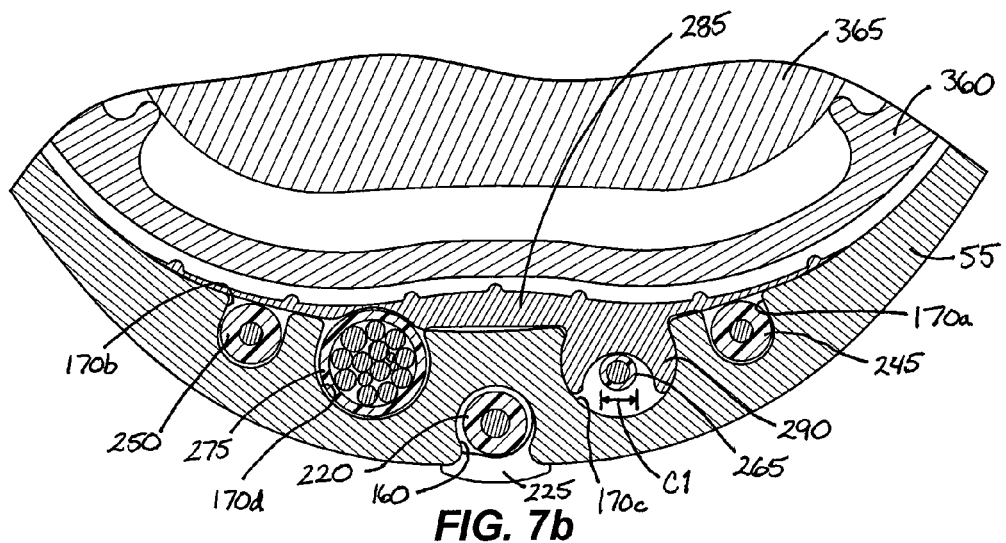
Figure 7A:
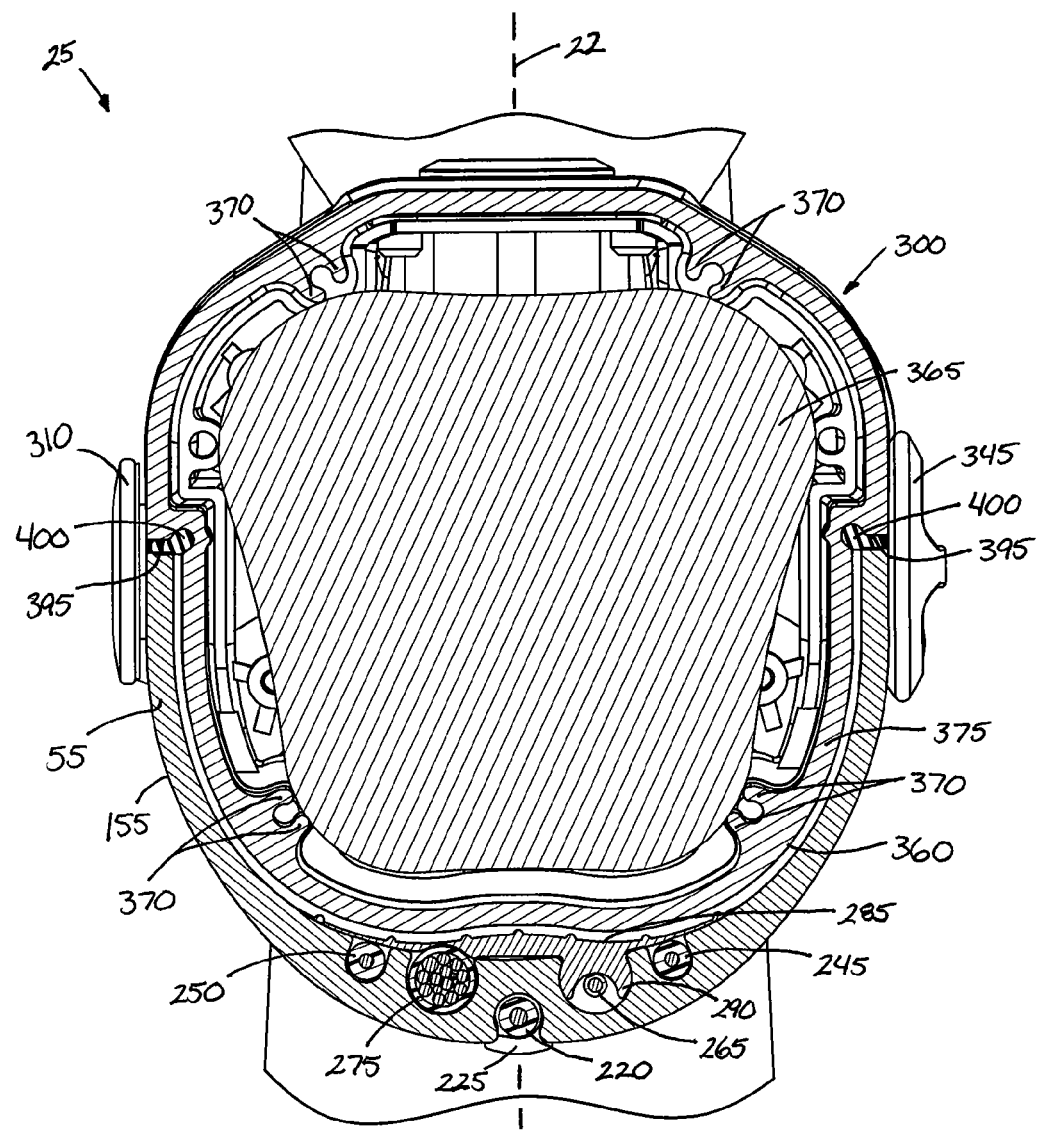
FIG. 7a is a section view of the frame taken along line 7-7 in FIG. 2.

As illustrated in FIG. 1, the bicycle 10 also includes a light cable 265 that is connected to a light 270 mounted on the handlebar assembly 40. The light 270 can be integrated with an electrical circuit (not shown) of the bicycle 10 or provided as a stand-alone component. With reference to FIGS. 7a, 7b, and 9, when the light 270 is integrated into the electrical circuit of the bicycle 10, the light cable 265 is routed from the handlebar assembly 40 through a third cable port 80 and is directed along the interior of the down tube 55 within the third interior groove 170c to a central power source and controller located on the bicycle 10, as described in detail below. As illustrated in FIG. 7b, the light cable 265 has a cable width C1 that is less than the third groove width W3.

With continued reference to FIGS. 1, 7a, 7b, and 9, the bicycle 10 includes a bus cable 275 that interconnects one or more bicycle-mounted electrical or electro-mechanical components (e.g., the front and rear shift controllers 135, 150, the front or rear brake controllers 195, 200, the light, a remote 280 that is attached to the handlebar assembly 40 or the stem assembly 45, a computer or data display, and/or other electrical or electro-mechanical devices such as an ANT+ device, a USB device, etc.) with the bicycle power source and controller. The bus cable 275 is routed from the handlebar assembly 40 through a fourth cable port 80, and is then directed along the interior of the down tube 55 within the fourth interior groove 170d.

While the bicycle 10 is described in detail with regard to the exterior and interior cables 220, 245, 250, 265, 275 routed in corresponding grooves 85, 90, other cables can be routed along the down tube 55 in addition or in lieu of the cables described herein. As illustrated in FIGS. 3, 7a, 7b, and 10, a cover 285 is attached to the interior surface 165 of the down tube 55 to provide a barrier between the interior-routed cables 245, 250, 265, 275 and the interior of the down tube 55. Specifically, the cover 285 is placed over the interior cable grooves 170 to hold the interior cables 245, 250, 265, 275 in position and to protect the cables 245, 250, 265, 275 from, among other things, debris and abrasion. FIGS. 7a and 7b show that the cover 285 is curved to conform to the concave interior surface 165 of the down tube 55.

With continued reference to FIGS. 7a and 7b, the cover 285 includes a protrusion 290 that has a crescent-shaped cross-section and that is dimensioned to snap into the third interior groove 170c to retain the cover 285 in position along the bottom wall of the down tube 55. Also, the protrusion 290 encapsulates or surrounds a portion of the light cable 265 and holds the cable 265 in place within the third cable groove because the cable width C1 of the light cable 265 is smaller than the third groove width W3. In this manner, the third interior groove 170c receives the third cable and attaches the cover to the down tube 55.

Referring to FIGS. 2, 3, 7a, 9, and 11-15, the bicycle 10 also includes a chargeport housing or receiver 295 and a battery pack 300 that are positioned within the down tube 55, and a lock mechanism 305 that is positioned within the bottom bracket shell 60 and in communication with the receiver 295. The receiver 295 is positioned adjacent a forward or uppermost end of the down tube 55 and has an outer profile that conforms to the inner profile of the down tube 55. The illustrated receiver 295 is secured in place within the down tube 55 by a fastener 310 (e.g., mounting bolt) that engages a hole 315 in the side of the receiver 295.

Figure 10:
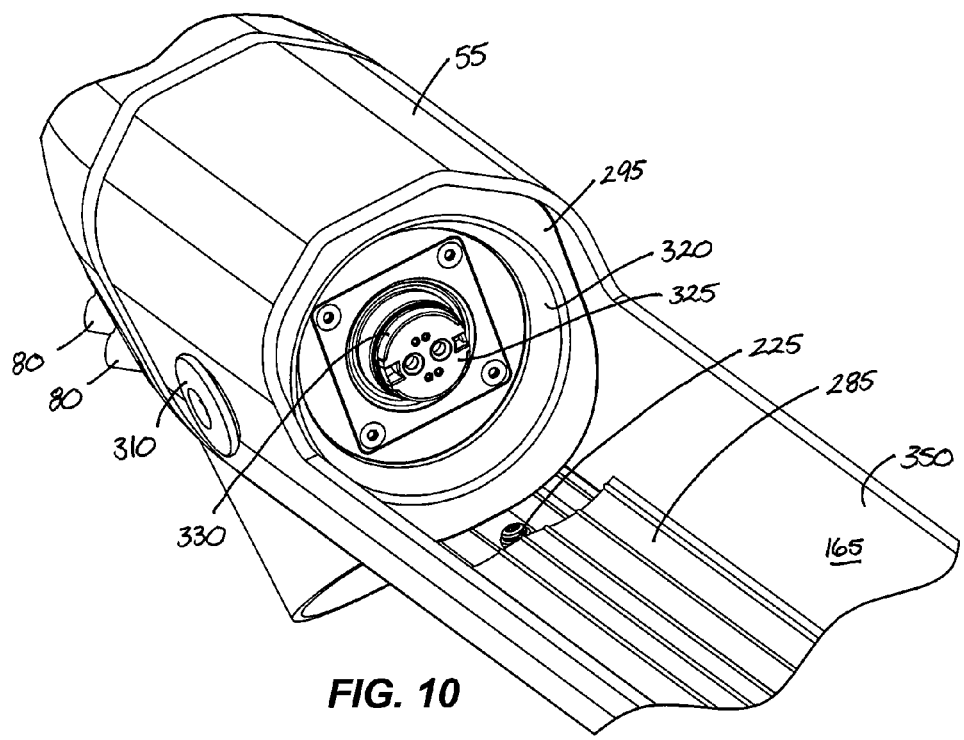
FIG. 10 is a perspective view of an upper area of the down tube with the battery pack removed.
Figure 11:
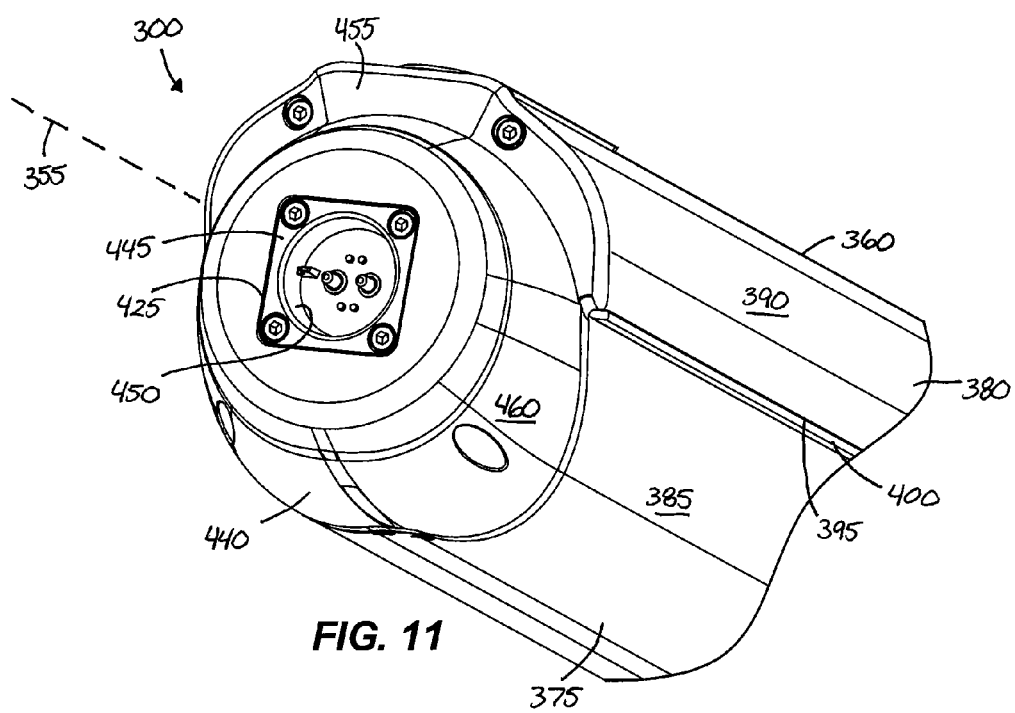
FIG. 11 is a perspective view of an upper end of the battery pack.

The receiver 295 supports the electrical connections between the chargeport 335 and the battery pack 300. FIGS. 9, 10, and 13 show that the receiver 295 includes an axially aligned recessed area or tapered socket 320 that is engageable by the battery pack 300. The tapered socket 320 has a first electronics interface or power connector 325 that is centered within the tapered socket 320. As illustrated, the power connector 325 is defined by a projection 330 with electrical contacts located near the center of the projection 330. With reference to FIG. 13, the power connector 325 is in electrical communication with a chargeport 335 that is attached to the receiver 295 opposite the fastener 310. The chargeport 335 is accessible from outside the down tube 55 and has a socket 340 that receives a charger cable (not shown). The chargeport 335 is electrically connected to the battery pack 300 via the power connector 325. The illustrated chargeport 335 is a pin-type electrical connector, although other types of electrical connectors are possible. As shown in FIG. 1, a chargeport cover 345 encloses the chargeport 335 to protect it from debris, fluids, and other material to which the down tube 55 may be exposed.

The battery pack 300 functions as the power source and controller for the bicycle 10. Referring to FIGS. 2, 3, and 7a, the battery pack 300 is disposed in a compartment 350 in the down tube 55, although the battery pack 300 can be supported in another tubular frame member (e.g., the top tube 50, the seat tube 65, etc.) depending on the desired location for the battery pack 300. The battery pack 300 is positioned in the down tube 55 so that the battery pack 300 is physically separated from the cables 245, 250, 265, 275 by the cover 285, and is further physically separated from the rear brake cable 220 by the cover 285 and the wall of the down tube 55. The receiver 295 is in communication with and accessible near an upper end of the compartment 350.

With reference to FIGS. 2, 3, 7a, and 11-13, the battery pack 300 defines a longitudinal axis 355 and includes an elongated shell or housing 360 that is partially nested in the down tube 55 and that securely supports one or more batteries 365 via inwardly directed support elements 370. In particular, the housing 360 has a lower portion 375 that is formed to fit within the compartment 350, and an upper portion 380 that conforms to the exterior profile of the down tube 55. As illustrated in FIG. 6, the lower portion 375 is curved and has a lower converging side surface 385 that are connected to an upper converging side surface 390 of the upper portion 380 at longitudinal shoulders 395. A gasket or seal 400 is coupled to the housing 360 at the longitudinal shoulders 395 (e.g., to dampen vibrations, or to inhibit infiltration of debris, fluids, or other material into the compartment 350). The battery pack 300 is recessed into down tube 55 such that the longitudinal shoulders 395 rest on the edge of the compartment 350 and are located so that the housing 360 visibly blends into down tube 55.

Figure 15:
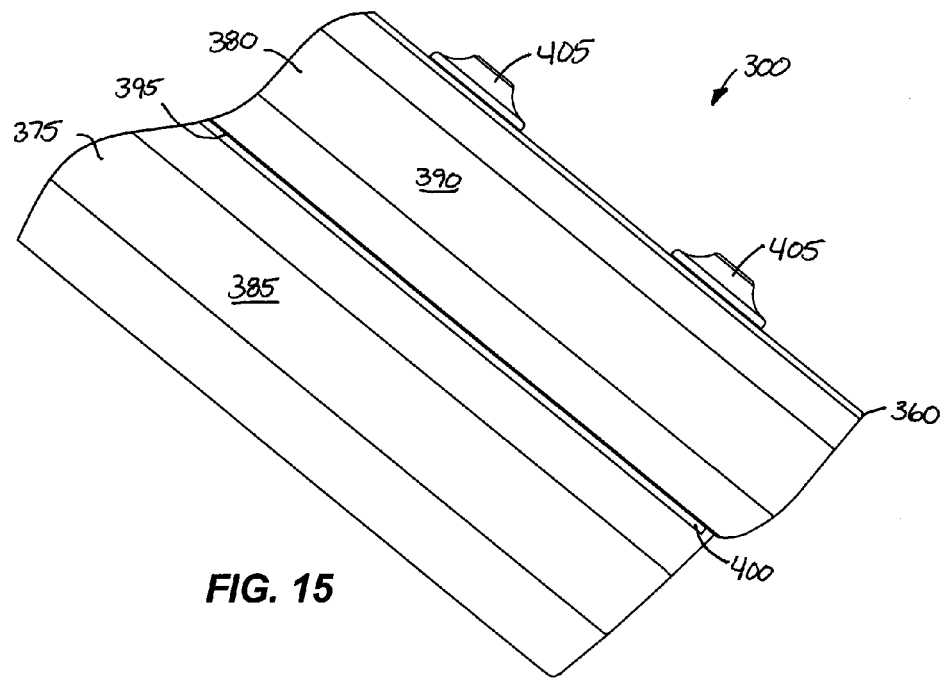
FIG. 15 is a side view of the lower end of the battery pack.
Figure 16:
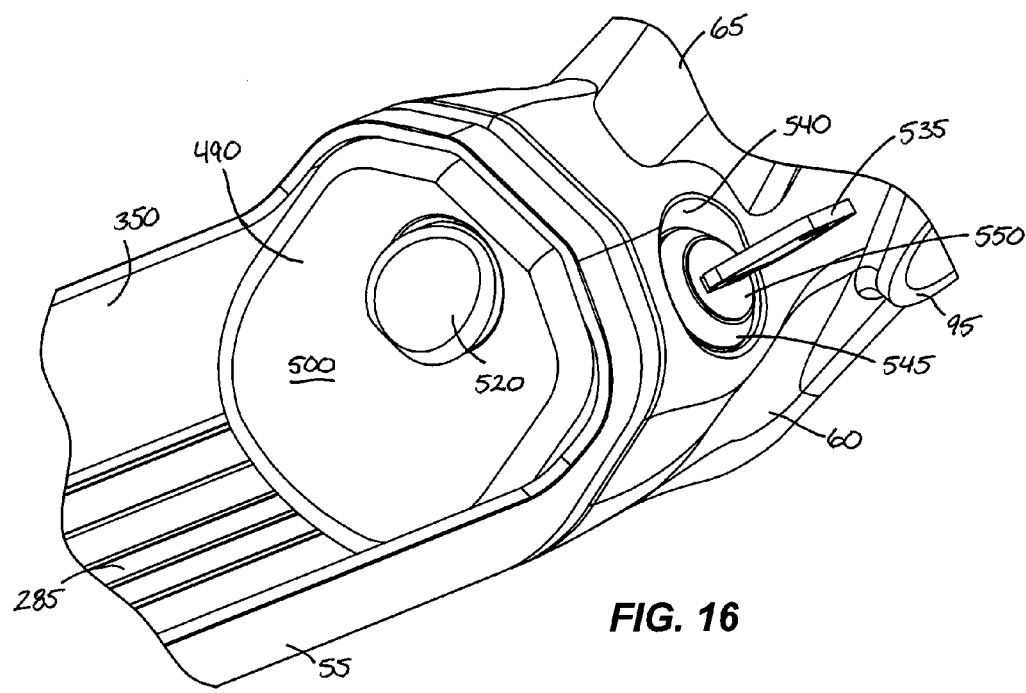
FIG. 16 is a perspective view of a lower end of the frame with the battery pack removed.
Figure 17:
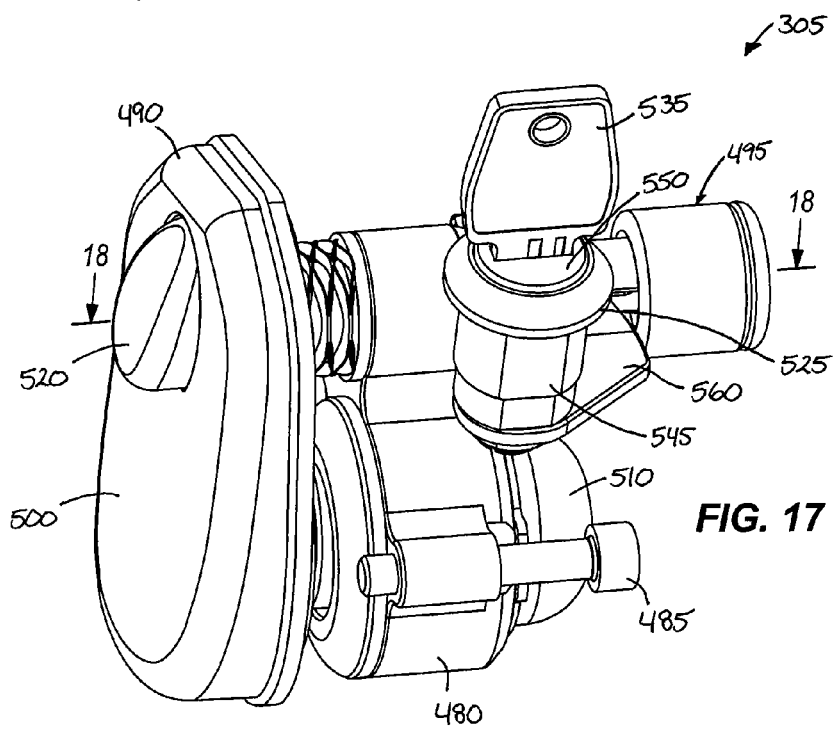
FIG. 17 is a perspective view of the lock mechanism.
Figure 18:
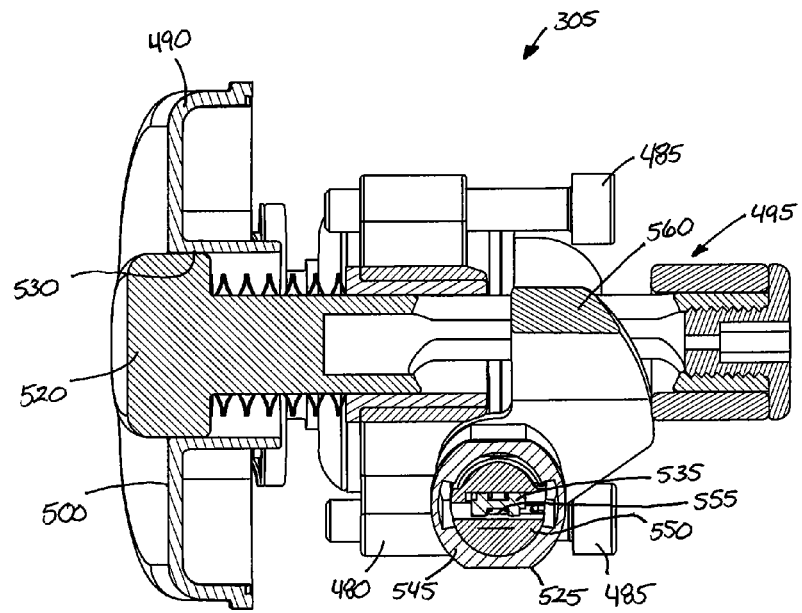
FIG. 18 is a section view through a spring-biased latch of the lock mechanism of FIG. 17.

As illustrated in FIG. 15, the housing 360 includes bottle cage mounts 405 that are attached to the exposed upper surface 305. With reference to FIGS. 1-3 and 15, a bottle cage 410 is mounted to the battery pack 300 by fasteners 415 that engage threaded openings 420 in the cage mounts 320.

FIGS. 3 and 11-13 show that the battery pack 300 also has a powered end cap 425 coupled to the upper end of the housing 360, and an on/off or power switch 430 located adjacent and electrically connected to the end cap 340. The power switch 430 can be either structurally attached to the end cap 340 or provided as a separate component on the battery pack 300. The illustrated power switch 430 includes a user interface or screen 435 to communicate information (e.g., the state of charge of the batteries 365) to a user.

The powered end cap 425 has a tapered protrusion 440 and a second electronics interface or battery connector 445 that is disposed on an end of the tapered protrusion 440. As illustrated, the battery connector 445 has a recess 450 with electrical contacts located near the center of the recess 450. When the battery pack 300 is disposed in the down tube 55, the tapered protrusion 440 is positioned within the tapered socket 320 of the receiver 295 so that the projection 330 engages the recess 450 to electrically connect the receiver 295 and the battery pack 300. The power connector 325 is detachably coupled to the battery connector 445 due to the interface between the receiver 295 and the battery pack 300 and the removability of the battery pack 300 from the down tube 55.

Figure 12:
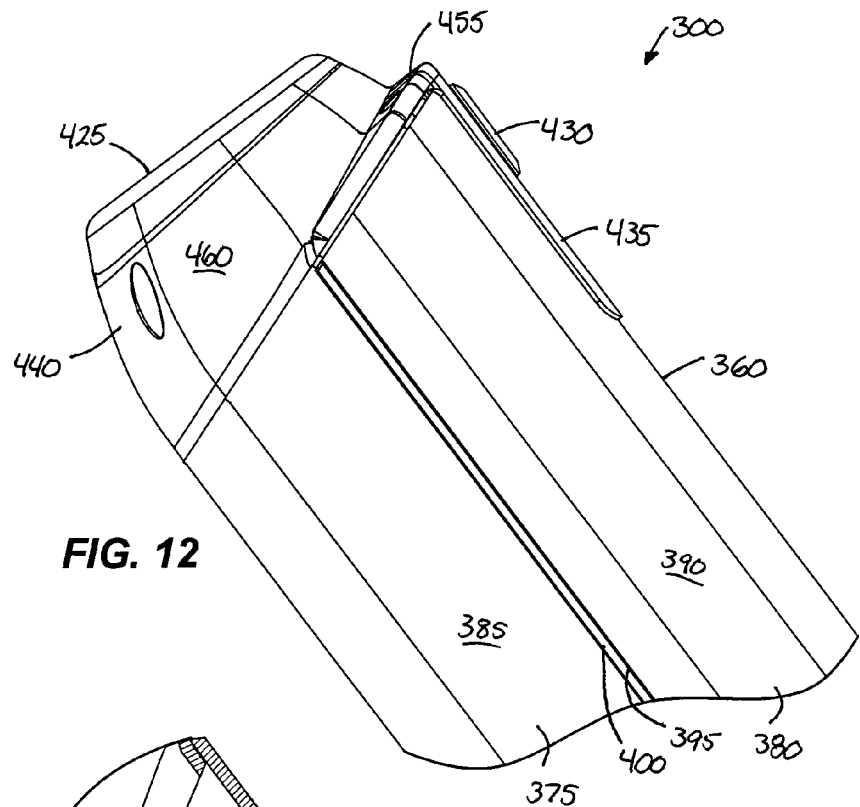
FIG. 12 is a side view of the upper end of the battery pack of FIG. 11.

With reference to FIGS. 12 and 13, a lateral shoulder 455 is positioned between the upper converging side surface 390 of the housing 360 and the tapered protrusion 440. The protrusion 440 is substantially bull-nosed shaped and is partially defined by a continuously tapered surface 460. The tapered surface 460 has a conical taper adjacent the upper portion 380 of the housing 360 and a curved taper opposite the conical taper (adjacent the lower portion 375 of the housing 360). In particular, the conical taper of the tapered surface 460 is curved in lateral cross-section (i.e., across or perpendicular to the longitudinal axis 355) and is planar or straight in longitudinal cross-section (i.e., along the longitudinal axis 355). As illustrated, the conical taper of the tapered surface 460 extends from the forward end of the powered end cap 425 toward the housing 360 and abuts the lateral shoulder 455. The curved taper is curved in both lateral cross-section and in longitudinal cross-section, and is substantially flush with the lower converging side surface 385 of the housing 360.

Figure 14:
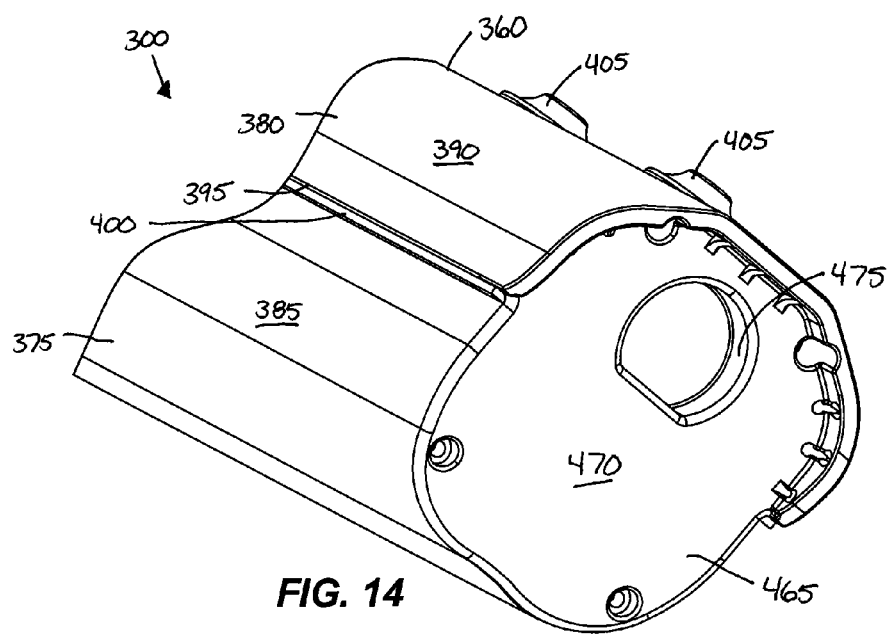
FIG. 14 is a perspective view of a lower end of the battery pack.

FIGS. 14 and 19 show a rearward end of the battery pack 300 that includes a securing end cap 465 enclosing the lower end of the housing 360. As illustrated, the securing end cap 465 has an end surface 470 that is oblique to the longitudinal axis 355, and a recess or opening 475 in the end surface 470 that is engageable by the lock mechanism 305 to secure the battery pack 300 in the down tube 55.

With reference to FIGS. 3 and 16-19, the lock mechanism 305 is located in the bottom bracket shell 60 such that the lock mechanism 305 is integrated with the shell 60. The lock mechanism 305 is disposed adjacent the lower end of the battery pack 300 and includes a chassis 480 with chassis bolts 485 that rigidly attach the lock mechanism 305 to chassis mounts inside the bottom bracket shell 60.

The lock mechanism 305 also includes a battery contact plate 490 and a latch assembly 495 that are attached to the bottom bracket shell 60 by the chassis 480. The contact plate 490 is supported by and is movable relative to the frame 25 into engagement with the securing end cap 465 to support the battery pack 300. As illustrated, the contact plate 490 has an oblique contact surface 500 facing the battery pack 300, and a rearwardly-projecting post 505 that is engaged by a spring-biased adjuster 510 to preload the contact plate 490. The adjuster 510 pushes the contact plate 490 toward the down tube 55 so that when the battery pack 300 is inserted into the compartment 350, the securing end cap 465 is engaged and pushed by the contact plate 490. In other words, the contact surface 500 is biased into contact with the securing end cap 465. The bias force of the contact surface 500 on the securing end cap 465 is adjustable using an adjuster bolt 515 that is threaded into the post 505. In this manner, the battery pack 300 is preloaded a desired amount by the contact plate 490 to limit longitudinal movement of the battery pack 300 within the down tube 55.

FIGS. 16-19 show the latch assembly 495 that is supported by the chassis 480. The latch assembly 495 includes a latch 520 and a lock cylinder 525 that is engaged with the latch 520 to lock and unlock the battery pack 300 relative to the frame 25. The latch 520 is movable relative to the contact plate 490 and has a locked position corresponding to a locked state of the lock mechanism 305, and an unlocked position corresponding to an unlocked state of the lock mechanism 305. The latch 520 is biased to the locked position in which the latch 520 protrudes through a hole 530 in the contact plate 490. The latch 520 is engaged with the opening 475 in the securing end cap 465 to secure the battery pack 300 in the frame 25, and includes an outwardly (i.e., convex) end profile so that the battery pack 300 can be secured in the down tube 55 without having to manually actuate the lock mechanism 305. In the unlocked position, the latch 520 is disengaged from the securing end cap 465 and is substantially flush with the oblique surface 415 of the contact plate 490 so that the battery pack 300 can be inserted or removed from the down tube 55. In the illustrated embodiment, when the battery pack 300 is latched into the down tube 55, movement of the latch 520 from the locked position to the unlocked position can only be accomplished by turning the lock cylinder 525, as described below.

With reference to FIGS. 4 and 16-18, the lock mechanism 305 is movable between the locked state and the unlocked state using a key 535 that is engaged with the lock cylinder 525. As shown in FIG. 3, the lock cylinder 525 is accessible by a user through an aperture 540 in the bottom bracket shell 60. The lock cylinder 525 includes a lock housing 545 and a plug 550 that has a keyway 555 with a predetermined key 535 profile so that when the appropriate key 535 is inserted into the keyway 555, the plug 550 can be rotated to move a cam-shaped lock lever 560. Movement of the lock lever 560 actuates the latch 520 between the locked position and the unlocked position.

The bicycle 10 also can include a motor (not shown) that is drivingly coupled to the rear wheel 20 to selectively provide motive force for the bicycle 10 and/or to act as a generator for an electrical circuit (not shown) of the bicycle 10. The motor is electrically connected to and powered by the battery pack 300, which can also serve as a controller for the motor and/or other electrical accessories on the bicycle 10.

After the frame 25 is assembled, the cables 220, 245, 250, 265, 275 are routed from the handlebar assembly 40 through the down tube 55 and are enclosed by the cover 285. The receiver 295 is positioned in and attached to the down tube 55 via the fastener 310, and the lock mechanism 305 is positioned in and attached to the bottom bracket 60 via the chassis bolts 485.

After the receiver 295 is attached to the down tube 55, the battery pack 300 is secured to the down tube 55 by aligning the powered end cap 425 with the tapered socket 320. With the powered end cap 425 so aligned, the battery pack 300 is nested in the compartment 350 by lowering the lower end of the battery pack 300 while at the same time lightly pushing the battery pack 300 forward into engagement with the receiver 295. The securing end cap 465 engages the contact plate 490, which is pushed slightly rearward (toward the bottom bracket shell 60) due to the preload on the contact plate 490. The battery pack 300 is automatically locked in the down tube 55 upon full insertion into the compartment 350 due to the outer profile of the biased latch 520. In embodiments that do not provide automatic locking of the battery pack 300 in the down tube 55, the battery pack 300 can be manually locked in the down tube 55 by moving the lock mechanism 305 to the locked state using the key 535. Because the battery pack 300 is firmly nested in the down tube 55, the battery pack 300 is protected from damage along the underside of the frame 25 by the down tube 55. The chargeport 335 can be used to recharge the batteries 365 without removing the battery pack 300 from the frame 25.

The lock mechanism 305 is completely integrated into the frame 25 so that all but the face of the lock cylinder 525 is visible on the exterior of the frame 25. The access opening 235 in the bottom bracket shell 60 provides access to the interior of the shell 60 so that the lock mechanism 305 can be assembled and maintained. Also, the cables 220, 245, 250 (and other cables, as necessary) can be easily routed from the down tube 55 and through the bottom bracket shell 60 (e.g., toward the seat tube 65 or the chain stays 85).

Various features and advantages of the invention are set forth in the following claims.

The invention claimed is:
1. A bicycle comprising:
a frame including a head tube;

a fork rotationally coupled to the head tube;
a wheel rotationally coupled to the fork;
a handlebar coupled to the fork for steering the wheel;
a battery pack supported by the frame and defining a longitudinal axis, the battery pack including a powered end cap having tapered protrusion with a portion that is curved in a longitudinal cross-section and a lateral cross-section and a battery connector on an end of the tapered protrusion; and
a receiver supported by the frame and including a tapered socket in which the tapered protrusion is positioned, the tapered socket including a power connector detachably coupled to the battery connector,
wherein the battery pack has a side surface and a shoulder between the side surface and the tapered protrusion on at least one side of the battery pack, and
wherein the tapered protrusion is bull-nosed shaped with a conical portion abutting the shoulder, and the portion that is curved is disposed opposite the conical portion.

2. The bicycle of claim 1, wherein the battery pack has a side surface and the tapered protrusion has a tapered surface that is flush with the side surface on at least one side of the battery pack.

3. A battery pack for a bicycle, the battery pack comprising:
an elongated housing adapted to support a battery; and
a powered end cap coupled to the housing and having tapered protrusion with a portion that is curved in a longitudinal cross-section and a lateral cross-section and a battery connector on an end of the tapered protrusion, the battery connector adapted to detachably couple to a power connector in the bicycle,
wherein the housing has a side surface and the tapered protrusion has a tapered surface that is flush with the side surface on at least one side of the battery pack,
wherein the battery pack has a shoulder between the side surface and the tapered protrusion on at least one side of the battery pack, and
wherein the tapered protrusion is bull-nosed shaped with a conical portion abutting the shoulder and a curved portion opposite the conical portion.

4. The battery pack of claim 3, wherein the powered end cap supports a power switch.

5. The battery pack of claim 3, wherein the housing has a bottle cage support.

6. The battery pack of claim 3, wherein the battery connector has a recess on the end of the tapered protrusion.

7. The battery pack of claim 3, wherein the battery pack defines a longitudinal axis, and wherein the tapered protrusion has a tapered surface that is curved in longitudinal cross-section.

8. A bicycle comprising:
a frame including a head tube;
a fork rotationally coupled to the head tube;
a wheel rotationally coupled to the fork;
a handlebar coupled to the fork for steering the wheel;
a battery pack supported by the frame, the battery pack including a securing end cap;
a contact plate supported by and movable relative to the frame, the contact plate including an opening and a contact surface that is biased into contact with the securing end cap; and
a latch extending through the opening and movable relative to the contact plate to secure the battery pack in the frame.

9. The bicycle of claim 8, wherein the battery pack defines a longitudinal axis and the securing end cap includes an end surface that is oblique to the longitudinal axis.

10. The bicycle of claim 9, wherein the contact surface is oblique to the longitudinal axis and in contact with the end surface.

11. The bicycle of claim 8, wherein the bias force of the contact surface is adjustable.

12. The battery pack of claim 1, wherein the tapered protrusion has a conical taper and a curved taper opposite the conical taper.

13. The battery pack of claim 3, wherein the tapered protrusion has a conical taper and a curved taper opposite the conical taper.

\* \* \* \* \*